United States Patent
Sen

(10) Patent No.: US 9,026,139 B2
(45) Date of Patent: May 5, 2015

(54) LOCATION-BASED COGNITIVE AND PREDICTIVE COMMUNICATION SYSTEM

(71) Applicant: Accenture Global Services Limited, Dublin (IE)

(72) Inventor: Prabir Sen, Glenview, IL (US)

(73) Assignee: Accenture Global Services Limited, Dublin (IE)

( * ) Notice: Subject to any disclaimer, the term of this patent is extended or adjusted under 35 U.S.C. 154(b) by 127 days.

(21) Appl. No.: 13/840,055

(22) Filed: Mar. 15, 2013

(65) Prior Publication Data

US 2013/0295963 A1 Nov. 7, 2013

(30) Foreign Application Priority Data

May 7, 2012 (SG) .................................. 201203337

(51) Int. Cl.
*H04W 24/00* (2009.01)
*H04W 4/02* (2009.01)
*H04W 4/20* (2009.01)

(52) U.S. Cl.
CPC .............. *H04W 4/028* (2013.01); *H04W 4/206* (2013.01)

(58) Field of Classification Search
CPC ..... H04W 24/10; H04W 40/24; H04W 40/34; H04W 64/06; H04W 64/003; H04W 4/026; H04W 4/4027; H04W 4/028; H04W 4/206
USPC ................ 455/404.2, 414.1, 418, 420, 456.1, 455/456.2, 456.3, 3.01, 3.05; 705/1, 7; 701/200, 201
See application file for complete search history.

(56) References Cited

U.S. PATENT DOCUMENTS

| 8,140,252 | B2 * | 3/2012 | Wise et al. .................... 701/120 |
| 8,660,498 | B2 * | 2/2014 | Gurney et al. ............. 455/67.11 |
| 2009/0287687 | A1 | 11/2009 | Martire et al. | |
| 2009/0319172 | A1 | 12/2009 | Almeida et al. | |
| 2010/0029263 | A1 * | 2/2010 | Senoo et al. .................. 455/423 |
| 2010/0070171 | A1 | 3/2010 | Barbeau et al. | |
| 2010/0082376 | A1 | 4/2010 | Levitt | |
| 2011/0028100 | A1 * | 2/2011 | Memik et al. ............. 455/67.11 |

FOREIGN PATENT DOCUMENTS

JP 2011-170453 A 9/2011

OTHER PUBLICATIONS

Ricci, F., "Mobile recommender systems" Information Technology and Tourism, Jan. 11, 2010, 24 pages.

"Patent Examination Report No. 1" on Australia Patent Application No. 2013205716, dated May 6, 2014, IP Australia, 7 pages.

* cited by examiner

*Primary Examiner* — Jean Gelin
(74) *Attorney, Agent, or Firm* — Mannava & Kang, P.C.

(57) ABSTRACT

A location-based cognitive and predictive communication system includes an interface connected to sensors to receive transactional data for an individual measured by the sensors. A memory stores the transactional data. The transactional data may be associated with a current travel path for the individual and includes a time and geographic location for the individual on the travel path. A prediction module may determine a current activity for the individual based on a prediction determined from the transactional data and may determine a choice set for the individual based on the current activity and based on predictions for a group for which the individual is a member. The choice set may include choices associated with transportation for the current travel path of the individual.

20 Claims, 13 Drawing Sheets

LOCATION-BASED COGNITIVE AND PREDICTIVE COMMUNICATION SYSTEM

PRIORITY

The present application claims foreign priority under 35 U.S.C. 119(a)-(d) to patent application number 201203337-9, filed in Singapore and having a filing date of May 7, 2012, which is incorporated by reference in its entirety.

BACKGROUND

Many location-based applications provide services based on location of a user. For example, many applications available for mobile devices provide recommendations based on the current location of the mobile device, such as identifying the closest restaurants or the closest gas stations. Some of these applications may consider user preferences, such as favorite restaurants or favorite types of cuisine. However, these type of applications tend to be rudimentary in their decision process and are often unable to draw inferences similar to a human decision process when determining recommendations. As a result, the applications may be relied upon for the factual information they can provide, such as closest gas station or type of cuisine provided by a restaurant, but their recommendations tend to be ignored by the user.

SUMMARY

A location-based cognitive and predictive communication system includes an interface connected to sensors to receive transactional data for an individual whose actions are measured by the sensors. A memory stores the transactional data. The transactional data may be associated with a current travel path for the individual and includes a time and geographic location for the individual on the travel path. A prediction module may determine a current activity for the individual based on a prediction determined from the transactional data and may determine a choice set for the individual based on the current activity and based on predictions for a group for which the individual is a member. The choice set may include choices associated with transportation for the current travel path of the individual.

A method of providing prediction-based travel choice set includes determining transactional data from sensors, wherein the transactional data is associated with a current travel path for an individual and includes a time and geographic location for the individual on the travel path; determining a current activity for the individual based on a prediction determined from the transactional data; determining a choice set for the individual based on the current activity and based on predictions for a group for which the individual is a member, wherein the choice set includes choices associated with transportation for the current travel path of the individual; and transmitting the choice set to an access device via network to present the choice set to the individual.

The methods and functions of the embodiments may be embodied as machine readable instructions stored on a non-transitory computer readable medium and which are executable by a processor.

BRIEF DESCRIPTION OF THE DRAWINGS

Embodiments are described in detail in the following description with reference to examples shown in the following figures.

FIGS. 9-12B show screenshots; and

DETAILED DESCRIPTION

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the description of the embodiments. Furthermore, different embodiments are described below, and may be used or performed together in different combinations.

According to an embodiment, a location-based cognitive and predictive system is operable to estimate a location-based human cognitive state based on location-based activities and trajectories using multiple sources of dynamic behavioral data, and to apply advancing analyses techniques, for example in real-time, to determine inferences and make individually-triggered adaptive decisions. Entities may respond to these inferences with personalized services at a location and at a moment in time that is relevant to the individual. Inferences for each individual may be aggregated to form a collection of dynamic decisions relevant to an individual, and the collection of dynamic decisions may be used to draw the inferences for the individual.

Figure 1:
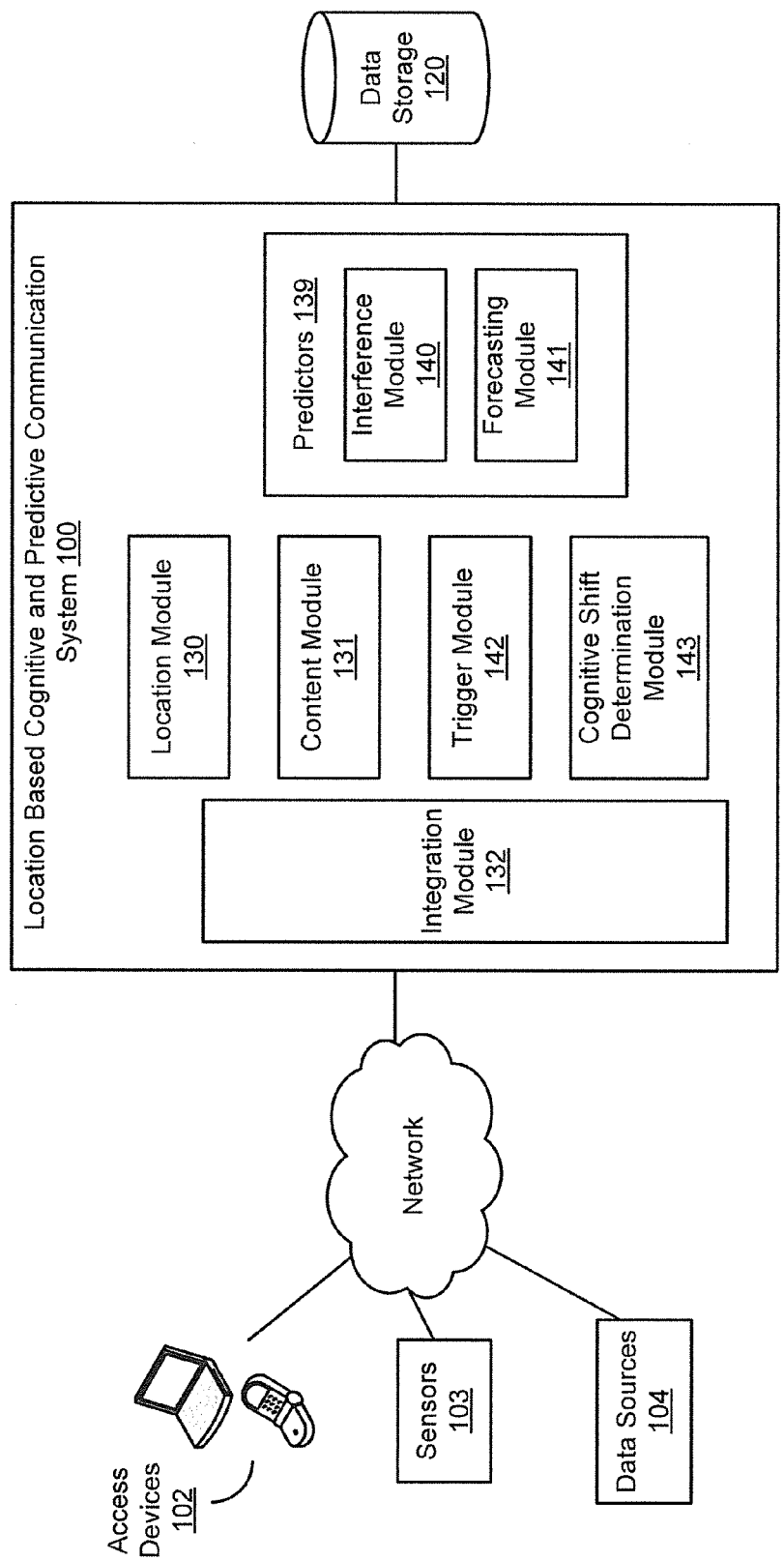
FIG. 1 shows a location-based cognitive and predictive communication system.

FIG. 1 illustrates the location-based cognitive and predictive communication system 100, according to an embodiment. The system 100 is able to gather data from multiple sources including access devices 102, sensors 103 and other data sources 104. The multiple data sources may be used to gather location and behavioral data of individuals and send the information to the system 100.

The multiple data sources including the access devices 102 may communicate with the system 100 over a network using any communication platforms and technologies suitable for transporting data, such as behavior data, content, geographic location data. Examples of networks may include wireless networks, mobile device networks (e.g., cellular networks), closed media networks, subscriber television networks, cable networks, satellite networks, the Internet, intranets, local area networks, public networks, private networks, optical fiber networks, broadband networks, narrowband networks, voice communications networks and any other networks capable of carrying data. Data may be transmitted data transmission protocols including, by way of non-limiting example, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), Individual Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, signaling system seven ("SS7") technologies, Ethernet, in-band and out-of-band signaling technologies, and other suitable networks and protocol technologies.

The access devices 102 may be associated with an individual, which may be a subscriber to one or more services (e.g., a wireless telephone service) provided over a network. Data provided from an access device or another source to the system 100 may be tagged to identify the individual, the access device or the source. An access device may include any device configured to perform one or more of the access device processes described herein, including communicating with system 100. An access device may include a wireless computing device, a wireless communication device (e.g., a mobile phone), a portable computing device (e.g., a laptop), a portable communication device, a personal digital assistant, a network connection device, a content recording device (e.g., a camera, audio recorder, video camera), a vehicular computing and/or communication device, and any other device configured to perform one or more of the access device processes described herein.

The sensors 103 may include any devices that can be used for measuring or determining metrics, such as traffic sensors, sensors detecting vehicle capacity, sensors detecting current time, sensors detecting arrival and departure time, location sensors, etc.

The system 100 includes data storage 120 that stores data used by the system 100 to make decisions about individuals and aggregate user behavior. The data storage 120, for example, stores transactional data about an individual's current activity, historical data that was used for previous decision making, content provided to individuals and generated by individuals and other information that may impact decision making, such as current weather, traffic reports, etc. The data storage 120 may include a database system or other type of storage system. The data storage 120 may include one or more data storage media, devices, or configurations and may employ any type, form, and combination of storage media. For example, the data storage may include a hard drive, network drive, flash drive, magnetic disc, optical disc, random access memory ("RAM"), dynamic RAM ("DRAM"), other non-volatile and/or volatile storage unit, or a combination thereof. Data may be temporarily and/or permanently stored in the data storage 120.

The components of the system 100 may include software, hardware or a combination of hardware and software. The components may include machine readable instructions stored on a computer readable medium and are executable by a processor or other processing circuitry to perform the functions of the system 100. The system 100 includes a location module 130 that determines the location of individuals from sensor data. For example, the access devices 102 or sensors may determine the geographic locations of individuals (which may be the locations of their access devices) using location technology, such as Geographic Information System (GIS), Global Positioning System ("GPS") technologies to determine the geographic location of the access devices 102 according to GPS coordinates. Other suitable technologies may be used, including using principles of trilateration to evaluate radio frequency signals received by the access devices 102 (e.g., RF signals in a wireless phone network) and to estimate the geographic location of the access devices 102. The geographic location data from the access devices 102 or sensors is sent to the system 100 and stored in the data storage 120. The location module 130 may determine the geographic location of individuals from this information.

The system 100 includes a content module 131 which may provide content, including content that has been created or received using an access device. For example, the content module 131 may receive content from the access devices 102, such as received individual choices (e.g. "I choose train for commute") and organize the content for storage in the data storage 120. The content module 131 may provide one of more functions, including but not limited to, annotating, processing, editing, rating, labeling, commenting, blocking, reporting, and categorizing content. The content module 131 may also determine a current choice, a target choice and choice updates at a travel path in real-time for an individual, and forecast choice updates for an individual in their travel path in real-time and notify individuals of their choices and updates via an access device.

The content module 131 also provides location-based target content services, which may include initiating the access devices 102 to provide data representative of the content and associated data (e.g., geo-location data and/or other tagged data) to system 100. The provided data, including the content, the associated geographic location data, and any other data used for forecasting a choice set for each individual may be provided to the system 100. The content module 131 may prompt an individual for approval or confirmation before data is provided to the system 100 or an access device may automatically provide the data to the system 100 once location data has been generated and associated with the content.

The content module 131 may also store content received from the access devices 102 (i.e., published content), and selectively distribute the content to other access devices based on their geographic locations. For example, when an individual with an access device enters within a predetermined origin physical location and/or a predetermined target physical location, i.e., a predefined geographic proximity, of a geographic location associated with particular content, the system 100 may make the content accessible to the individual within the predefined geographic proximity between the origin and target locations and within specified locations between the origin and target locations. The system 100 may send a notification that the content is accessible to an access device within the predefined geographic proximity, and the individual may utilize the access device to request and receive the content from the system 100.

In this or similar manners, individuals of the access devices 102 may create and receive content based on current geographic location, target geographic location and/or a mobility state (e.g., "travel" and "dynamic"). The mobility state may include an individual's stationary state or travel state updates for example indicating location updates as the individual travels from a current geographic location to the target geographic location. The content may be associated with current content being provided to the individual, content associated with the target location, content for travel, content associated with a current activity of an individual, etc. Content may be based on forecasts and forecast updates, which may be provided in real-time, based on current and future activities and travel path trajectories. Content may be communicated for current communications and communication-threads in travel paths in real-time. Content may be distributed via multicast or unicast techniques. The availability of content may be selectively notified to the access devices 102 based on the geographic locations and settings validated with an individual's account. Accordingly, individuals are able to share content with one another in connection with geographic locations.

The content module 131 may provide an individual, which may be associated with particular content and/or particular geographic locations, with one or more tools for annotating the content and/or communicating with other individuals. For example, an individual who has been authenticated to publish content may annotate the content such as by editing the content, rating the content, or publishing a comment about the content to the system 100. The individual who published the content may access the annotation and respond to the individual who provided the annotation. Such communications between the individual may be processed as a communication-thread to which the individual involved may be granted access. Annotations may be updated and distributed in real-time. Examples of annotations may be travel updates, such as bus is full, accident information, etc.

The system 100 supports a wide variety of applications and uses. In one example, an individual may utilize an access device (e.g., a mobile phone) to record video for shopping at a local train station. The access device may be configured to detect the geographic location at which the video content was created, associate the video content with the geographic location, and post the content and location. This may be referred to as publishing a location-based content. When another individual with another access device riding the bus enters within a predefined geographic proximity associated with the published content, the system 100 may send a notification of the accessible content to the access device and the individual may utilize the access device to download and view the content.

With the geographic connection to the train station and the video content being established, either of the two individuals may annotate the content and/or create a communication thread between each other. For example, one individual may view the video and provide a comment, e.g., "Bus arriving in 5 minutes!", to system 100. Other individuals to the train station may similarly gain access to any published content associated with the geographic location of the train station and threads. A thread may include a series of messages between individuals that are associated by location, content, and/or another attribute.

As another example, during a trip an individual may post content to the system 100 and subsequently use the published content as a travel log. For instance, the individual may access and group published content based on the different geographic locations associated with the content and/or a period of time corresponding with the trip. The published content may be presented in the form of a virtual travel log or scrapbook. As another example, an individual may travel to a particular geographic location and gain access to published content associated with the geographic location. The individual may be able to utilize the published content to plan and/or improve the individual's activities at the geographic location. For example, published content may include suggestions as to recommended places to eat, places or people to visit, etc. Such publishing may be provided by other travelers on the same or similar travel path and may be based on their experiences. In yet another example, a content instance may be used to distribute local information. For instance, an organization may provide a content instance on the travel path for informational purposes, including information about road construction, road closures, traffic patterns and conditions, ski resort conditions, travel directions, etc. A sporting event venue may post content including game highlights, schedules, maps, and team roster information. A college may post class information, maps, and parking information. An individual who gains access to the published information may annotate and/or respond to the information as described above. For example, an individual viewing published content descriptive of road construction timeframes may notify the organization that published the content about current site conditions (e.g., the road has been reopened or travel is restricted to one lane).

The system 100 may include an integration module 132. The integration module 132 may transmit and receive communications over the network, including receiving data representative of content and associated data (e.g., location data) from and providing data representative of content to access devices 102 by way of the network. The integration module 132 may include and/or support any suitable communication platforms and technology for communicating with and transporting content and associated data to/from access devices 102 over a network in unicast and multi-cast formation. The integration module 132 may be configured to support a variety of communication platforms, protocols, and formats such that the system 100 can receive content from and distribute content to a variety of platforms (e.g., a mobile telephone service platform, a web-based platform, a subscriber television platform, etc.) and using a variety of communications technologies in unicast and multi-cast formation.

The system 100 may include modules for making predictions. The predictions may be predictions for determining the current and next activity of an individual. For example, the system 100 may determine the current location and the current time of an individual based on sensor data and other data received from the data sources. The system 100 may use historical data for the individual to predict that the individual's current activity is traveling to a bus stop. The system 100 may make additional predictions about the individual's future activity, such as the user is en route to work and the user has a set of choices for traveling to work, such as by bus or by taxi. Predictors 139 may include an inference module 140 and a forecasting module 141 for making the predictions. Examples of different functions and technologies for the predictors 139 are described below. A predictor is a function or logic for making a prediction based on current data (e.g., transactional data) and/or historical data.

The inference module 140 may predict the current and future activities of an individual. The inference module 140 may use transactional data, such as the geographic location data, time, or other measured metrics, to make the predictions about the individual's activities. The inference module 140 may use "memoryless" Markov decision functions (e.g., Markov Chain Monte Carlo (MCMC)) on transactional data, "partial memory-based" Markov functions on historical data, or a Bayesian Belief Network (BBN) to predict current activity or make other predictions about an individual. For example, the inference module 140 uses transactional data, such as location-based dynamic behavioral data, from the data sources to predict an individual's movement, recognize individual's location-based target activities and to respond with content and content updates within an ultra-short duration, such as real-time or near real-time. The inference module 140 may make these predictions even when geographic and temporal behavioral information is only partially available, which may include instances when information from some of the data sources may be missing.

A forecasting module 141 may predict choices, also referred to as target choices or a choice set, for an individual. For example, the forecasting module 141 may determine that an individual is travelling to work and predict that the individual has target choices of taking the bus, train or taxi to get to work. The forecasting module 141 may use evolutionary algorithm ("EA"), support vector machines ("SVM"), evolutionary game ("EG") and/or quantum statistical mechanics ("QSM") to make predictions and to provide a dynamic optimal response as a feedback-loop for each individual modeled as a quantum candidate. The forecasting module 141 may develop a drift-diffusion cognitive model to calibrate queuing and to predict an individual's location-based target activities and choices with a goal of dynamically as well as optimally responding with personalized content including, by way of example, messages, audio-video, photos, advertising (also "content") to each individual.

The forecasting module 141 may use QSM to model each individual as a particle to predict activities of a group of individuals. Based on the predictions for the group, an optimal set of choices may be determined for an individual or for a service. For example, if the predicted activities for a group indicate that a large number of individuals are travelling to the bus stop, the forecasting module 141 may modify the individual's target travel choices to eliminate the bus or provide content, such as notifications, about bus capacity. A transit authority may use this information to dispatch another bus to accommodate excess capacity. Also, QSM may be used to estimate the cognitive state of an individual, which may include their experience for an activity.

The forecasting module 141 may use sheafing techniques to systemically monitor locally-defined behavioral information attached to open sets of a topological space of behavioral information in "spread out." The behavioral information can be restricted to smaller sets, and the behavioral information assigned to an open set may be equivalent to all collections of compatible behavioral information assigned to collections of smaller sets covering the original individual in various formations, such as structure-preserve mapping, morphism, disjoint union, combined with stochastic and optimal control methods. The optimal control methods may include stochastic gradient descent, to develop an optimal mobile drift-diffusion cognitive model in groups (also "collection of individuals") of target activities for collective target choices with a goal of dynamically as well as optimally responding with content to each group comprising a set of individual quantum candidates. This method is particularly advantageous over traditional segmentation and clustering when forecasting spatial-temporal behavioral information as a formation of a group where individuals move from one group to another in a dynamic and mobile environment may be available only partially, i.e., when information from some of the sources may be missing.

A trigger module 142 may generate triggers for individuals to confirm current activities and other information. For example, the inference module 140 may determine a probability that an individual is en route to work. The trigger module 142 receives the probability and may trigger a question to confirm the current activity, such as sending a question to an access device of the individual asking if the individual is en route to work. If the individual confirms, then the probability may be changed to 100%. Triggers may be generated to confirm any predictions generated by the system 100.

The system 100 may also include a cognitive state determination module 143, which determines the experience of the individual performing an activity that is identified by the system 100. The cognitive state determination module 143 may send instructions or questions to an access device to determine cognitive state, such as are you enjoying; are you having fun; provide a rating, etc. For example the system 100 determines the bus had sufficient capacity to accommodate all riders and that the bus was on time. The cognitive state determination module 143 may trigger an instruction to individuals to rate their experience. The ratings received from access devices are stored as historical data.

The system 100 may also include a service optimization module 144. The service optimization module 144 uses the predictions generated by the system 100 to select service options, such as selecting next activity choice options that are modified based on the predictions.

Figure 2:
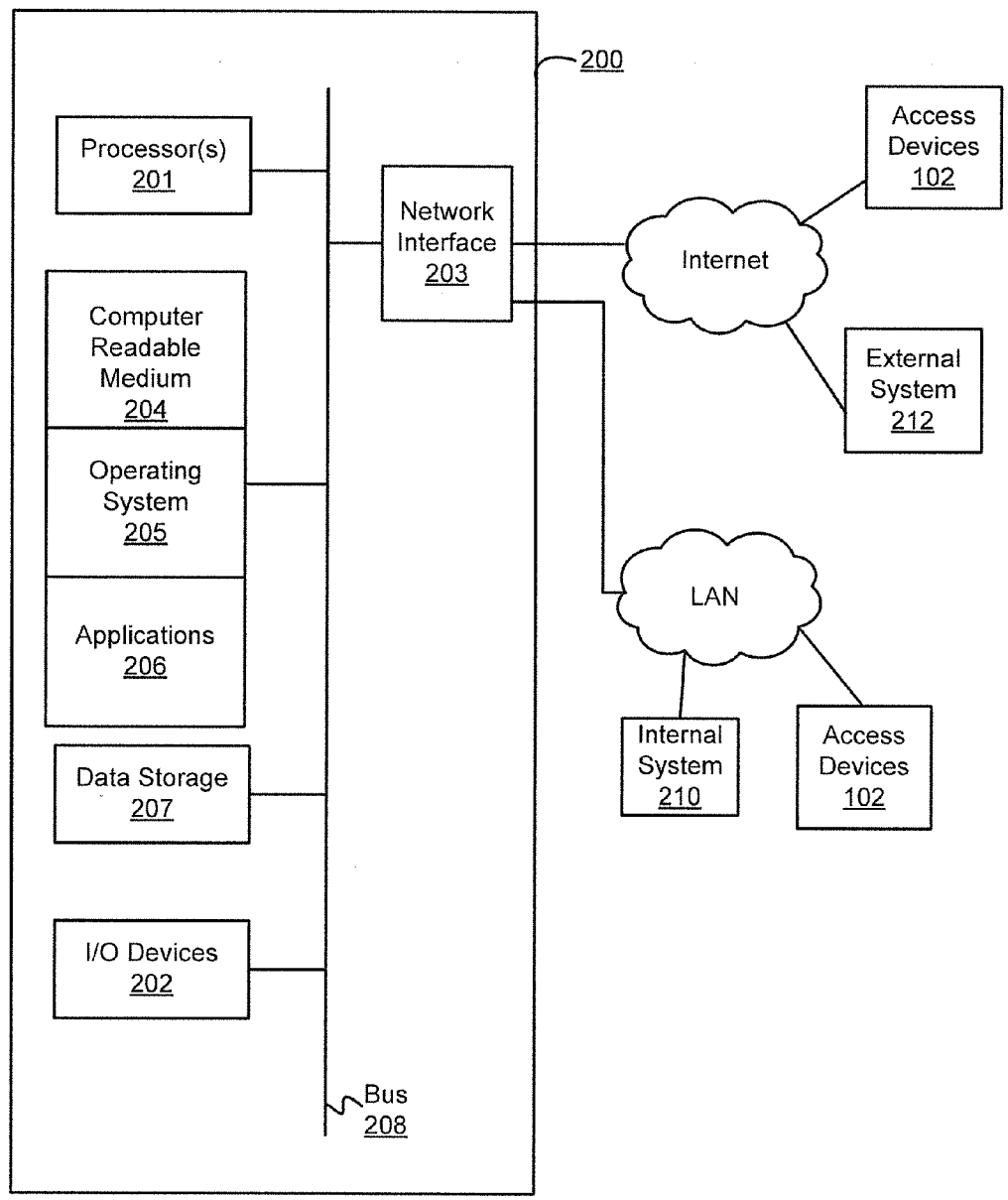
FIG. 2 shows a computer system platform that may be used for the location-based cognitive and predictive communication system.

FIG. 2 illustrates an example of a computer system that may be used for the system 100. The computer system 200 may include additional components not shown and some of the components described may be removed and/or modified. For example, the computer system 200 may represent a server that hosts and executes the system 100 or the computer system 200 may comprise one of multiple distributed servers that performs the functions of the system 100 in a distributed computing environment, such as a cloud computing environment.

The computer system 200 includes processor(s) 201, such as a central processing unit, ASIC or other type of processing circuit; input/output devices 202, such as a display, mouse keyboard, etc., a network interface 203, such as a Local Area Network (LAN), a wireless 802.11x LAN, a 3G or 4G mobile WAN or a WiMax WAN, and a computer-readable medium 204. Each of these components may be operatively coupled to a bus 208. Computer readable medium 204 may be non-transitory and comprise any suitable medium which stores machine readable instructions to be executed by processor(s) 201. For example, the computer readable medium 204 may be non-transitory and/or non-volatile, such as a magnetic disk or volatile media such as RAM. The instructions stored on the computer readable medium 204 may include machine readable instructions executed by the processor(s) 201 to perform the methods and functions of the system 100. The computer readable medium 204 may include solid state memory for storing machine readable instructions and/or for storing data temporarily, which may include information from the data repository, for performing project performance analysis.

The computer readable medium 204 may store an operating system 205, such as MAC OS, MS WINDOWS, UNIX, or LINUX, and one or more applications 206, which include a software application providing the system 100. The operating system 205 may be multi-user, multiprocessing, multitasking, multithreading, real-time and the like.

The computer system 200 includes a data storage 207 including a database or other data storage system for the data storage 120 shown in FIG. 1 or the computer system 200 may be connected to a database server (not shown) hosting the data storage 120.

The network interface 203 connects the computer system 200 to other devices and systems via a network. For example, internal system 210 and one or more of the access devices 102 may be connected via a LAN and external system 212 and one or more of the access devices 102 may be connected via the Internet. The internal system 210 and the external system 212 may include the sensors 103 and data sources 104 shown in FIG. 1. In other embodiments, the system 100 in FIG. 1 or some of the components of the system 100 may be embedded into device 102 or sensors 103 or other data sources 104 and form one or multiple networks (as in case of social-technologies) which can communicate amongst each.

Figure 3:
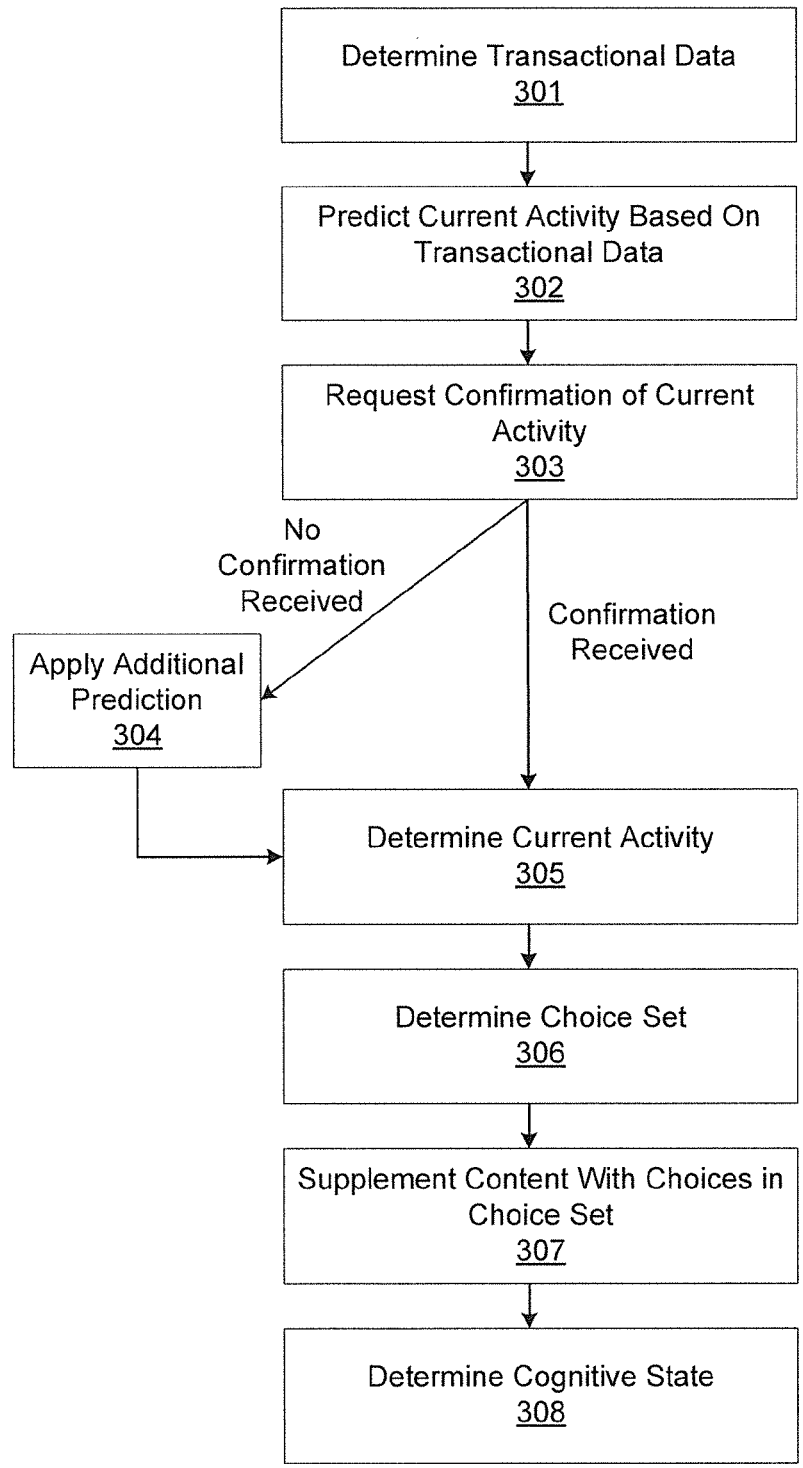
FIG. 3 shows a method for determining a choice set and a cognitive state.

FIG. 3 illustrates a method 300 for predicting the next activity of an individual. The method 300 may be performed by the system 100 shown in FIG. 1. At step 301, transactional data is determined for an individual. The transactional data may include the current location (i.e., geographic location) of the individual, current time and other metrics which may include sensor-measured metrics. The location and time for example may be determined based on location and time data received from an access device for the individual.

At step 302, the transactional data is used to predict the individual's current activity. The transactional data may include the location data and/or other measured metrics that may indicate the current activity of the individual. The inference module 140 shown in FIG. 1 may use a BBN or another type of predictor to predict the individual's current activity based on the transactional data. The prediction may include determining a probability that the individual is performing a current activity, such as whether the individual is en route to work.

At step 303, a confirmation of the current activity is requested. For example, the trigger module 142 requests a confirmation from the individual.

At step 304, if no confirmation is received, an additional predictor is applied to estimate the current activity. For example, the inference module 140 may apply MCMC or SVM or another type of predictor to behavioral data and/or the transactional data to predict the current activity of the individual. Behavioral data may include historical data for the individual, including previous routes traversed by the individual, previous activities performed by the individual, etc. Pattern recognition based on historical data, which may be performed by an SVM predictor, can be used to analyze historical data to predict the current or next activity.

At step 305, the current activity is determined for example based on a received confirmation or based on the predictions at steps 302 and 304.

At step 306, a choice set comprised of a set of choices for a next activity to be performed by the individual are determined based on the current activity of the individual, the individual's location and behavioral data for the individual. Predictors, which may include QSM or other types of predictors, may be used by the forecasting module 141 to determine a set of choices of the next activity. For example, if the current activity is the individual is leaving for work, the set of choices may include different transportation options for getting to work. The different options may be predicted by one or more predictors. At step 307, the choice set may be supplemented with content about each choice which can be related to the current and/or next activity. For example, the content may be related to the different transportation options, such as the estimated time of arrival (ETA) of the next bus or next train, traffic conditions, etc., or may include content from other individuals, such as taxi availabilities, etc.

Figure 5:
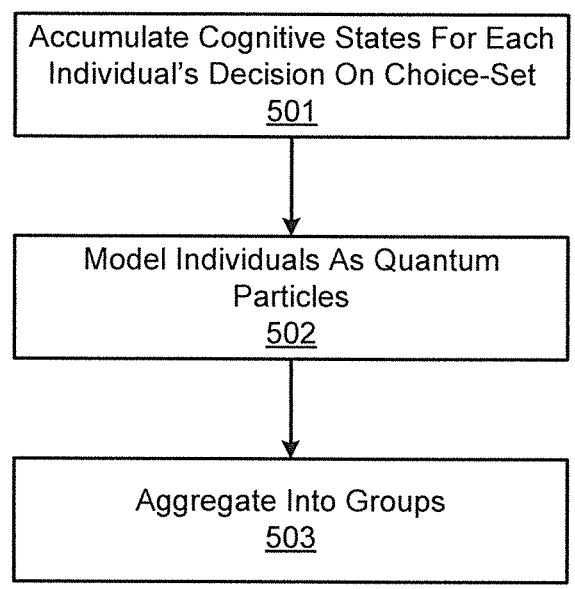
FIG. 5 shows a method for aggregating cognitive states using quantum mechanics.

Also, the inference module 141 may use a QSM predictor to identify the best choices for an individual based on aggregate predictions for a group of individuals performing similar activities in the same or proximate location. FIG. 5 shows an example of a method for determining groups using QSM and using the groups to determine the choice set.

At step 308, a cognitive state of the individual performing the activity is determined. For example, the cognitive state determination module 143 may determine the experience of the individual performing the activity by sending requests for the cognitive state to the access device of the individual. The cognitive state may represent the experience of the individual. For example, the cognitive state may represent a level of satisfaction for a particular choice in the choice set that was performed by the individual. Triggers including requests sent to the access device may ask the individual about their experience. For example, a request may request the individual to rate their experience. The cognitive state may be stored as historical information.

FIG. 3 shows a trigger generated at 303 to request confirmation of the current activity. Although not shown in FIG. 3, triggers may be generated throughout the method 300 to request confirmation of actions performed or cognitive state. For example, a trigger may be generated to determine the next future activity of the individual, such as whether the individual desires to stop for coffee on the way to work. The response to this trigger may modify the choice set or confirm the choice set or generate other triggers. For example, if the individual indicates they want to stop for coffee, the next choice set may identify coffee shops within range and/or generate attribute-related triggers, such as whether the individual desires better quality or lower price coffee. Also, triggers may be generated to determine or confirm the cognitive state.

Also, one or more predictors may be applied at step 306 to determine the choice set. In addition, after step 308, the cognitive state determined at step 308 may be used to determine the choice set for future activities. An example of determining the choice set is further described with respect to FIG. 5.

Figure 4:
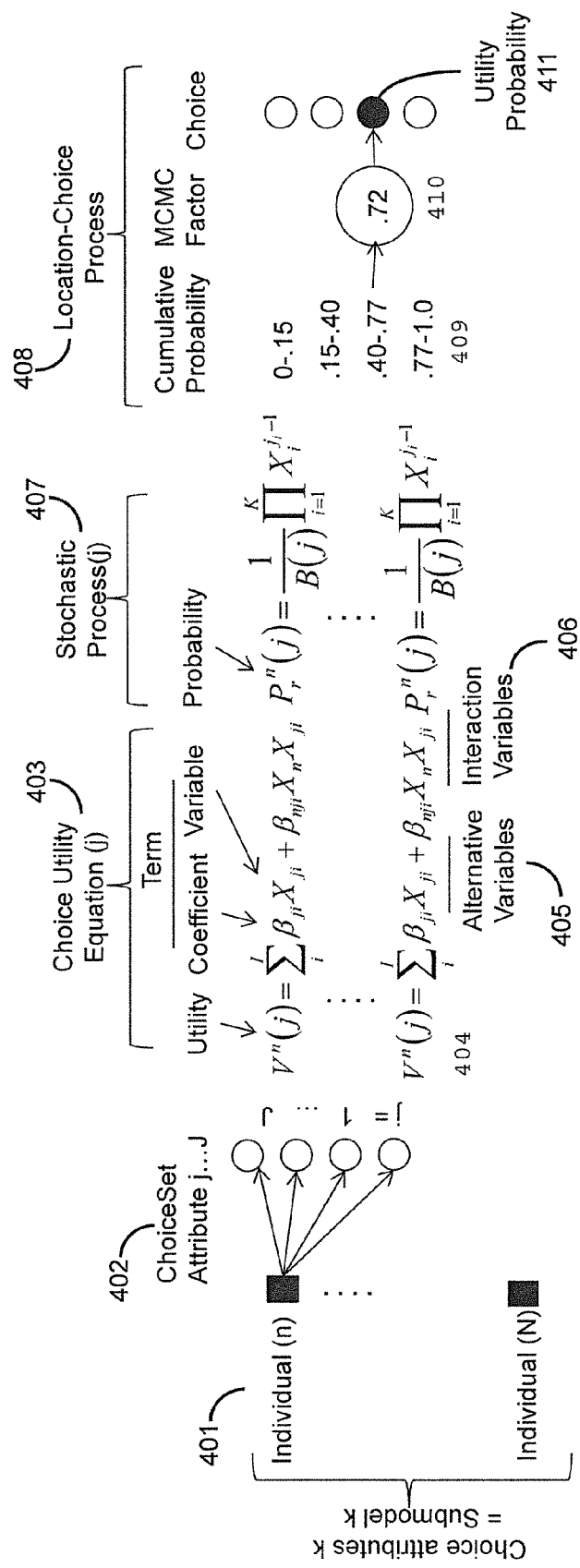
FIG. 4 shows a computational process for determining a cognitive state.

FIG. 4 illustrates a computational process which may be executed by the system 100 for determining a utility probability for each of the choices which may be provided in a choice set. This may include choices in a choice set determined at step 306 of the method 300. The utility probability may include an estimation of a cognitive state for each choice. The utility probability may be used for the cognitive state determined at step 308 of the method 300.

In FIG. 4, 401 indicates that a set of utility probabilities may be determined for each chooser (n). A chooser is an individual. For example, there is N number of individuals whereby each individual n is one of the individuals 1 ... N. 402 indicates that different choice set attributes may be determined. The attributes may describe a good or service associated with a choice. A choice set attribute may comprise one or more attributes, such as one or a combination of sensory attributes, (taste, looks, etc.), rational (price, ingredients, etc.) and psychological/emotional (feel good, lifestyle, etc.). Each set of attributes for a choice set is expressed as j where j=1 ... J whereby each attribute may have a scale (e.g. high-medium-low) of m.

The choice utility equation 403 determines a utility 404 for a particular attribute j and for a particular individual n. The utility value calculated for a particular attribute j and for a particular individual n is shown as $V^n(j)$. The utility 404 is the expected level of satisfaction for a good or service for the attribute j and the individual n. The utility 404 is determined for each attribute j=1 ... J. There may be multiple choices in a choice set and each choice may have attributes j=1 ... J, so utility 404 is determined for each choice set, and is also determined for each individual. For example, a choice may be whether to purchase an expensive, high quality coffee or a low-cost coffee. Examples of the alternative variables 405 may include product, brand or variant alternatives (e.g., house coffee and dark coffee) that are available in the choice set for an individual to exercise preference. Variables are shown as X and a choice for one over another is expressed as (1 ... i) of X. The interaction variables 406 may include bargaining variables, such as coupons, discounts, auction-bids, promotions that are available for individuals to exercise preference, or any variable involving an interaction of an individual for a good or service. The coefficients, shown as beta, may be predetermined and represents a diminishing level of satisfaction, for example, over time.

407 indicates a stochastic subprocess may be executed to determine expectations by updating the probability of an individual (n) being in an unobserved state r at time t. $P_r^n(j)$ is the probability of an individual (n) being in an unobserved state r at time t for an attribute j. 408 indicates a location-choice subprocess to determine the cognitive state for each choice associated with a choice set attribute. For example, the cumulative probability 409 may be determined from the probabilities determined at 407. An MCMC factor of 410 may include a multidimensional optimizing factor determined using Monte Carlo Markov Chain, Hidden Markov Model (HMM), quasi-Newton or another technique to find the optimal weights at each gradient of a location-based activity-based choice. The output is the utility probability 411 for a choice. The utility probability may be determined for each choice corresponding to a choice set attribute (i.e., each choice having the attributes of a particular choice set). A choice from the choice set that was selected/performed by the individual is determined and the utility probability for that choice may be used for the cognitive state.

Choice models predict choice probabilities and a choice algorithm used for multinomial choice models may use MCMC distribution of choice outcomes for accurate approximation for a location-based decision. For example, if a person is likely to prefer premium coffee to tea, and the person is on the way to the airport in the morning, and the airport has a coffee shop at various locations, then the person's likelihood of buying coffee at the airport can be derived from his previous choice experiences, with varying approximate empirical probability estimations, i.e., the person may exercise a new choice for soda instead of coffee or select a different coffee shop than usual. This dispersion effects when factorized variational posteriors are more concentrated around the multiple choices (multinomial logit) than the location (MCMC) posterior.

FIG. 5 illustrates a method 500 of aggregation into a group (or family of cognitive sets) which may be used to determine a choice set or to determine content to distribute for a particular time and location. The method 500 uses QSM to model each individual as a quantum candidate, i.e., a particle, in order to predict activities of a group of individuals. Based on the predictions for the group, an optimal set of choices may be determined for an individual. The method 500 may be used to determine the choice set of step 306 of the method 300 based on the modeling of each individual as a quantum candidate and the aggregation of the quantum candidates into groups to make predictions for the group.

At 501, cognitive states for each individual's decision on a choice-set are accumulated. For example, the cognitive state for the last activity performed for individuals 1 to N are accumulated. A relational activity model may be used to accumulate the cognitive states. FIG. 4 illustrates a general framework for sensor-based activity recognition based on a set of cognitive states and attributes in each cognitive state. Examples of the attributes are described above and may also include a decision or a preference. A relational clique c∈c is a construct of a clique over all activities at various locations on a trajectory, which may be a travel path of one or more individuals. Each clique C is associated with a potential function $\phi_c(v_c)$ that maps a tuple (values of decisions or aggregations). Together they provide a) activity-based decision, b) location and c) transition of consecutive activities as expressed by the following equation $\Sigma_y \Pi_{c \in C} \Pi_{v'_c \in c} \phi_c(v'_c)$.

At 502, each individual is modeled as a quantum candidate. For example, each individual's last decision may be modeled as a function of one or more of time, location, transition and constraints. For example, a single individual's cognitive state is determined and then Z is defined, where Z is the probability statistical distribution of finding the individual in any particular cognitive state associated with a decision U, individuals N and location-density V. Z is proportional to the degeneracy of the accumulated cognitive states (of R as in Relational activity model). The grand sum is the sum of the exponential, which may be determined by expanding the exponential in Taylor series, over all possible combinations of U, V and N. Any one single individual's decision state has two possible cognitive states, for example, one having one choice set and other having no choice set. If the location-density of cognitive states are known, then the system 100 can calculate all of the individual state variables including the individual's variables using the following expression:

$$Z = \Sigma(1+\exp(N_\mu - N_\epsilon)/\tau = 1/(1-\exp(\mu-\epsilon)/\tau)$$

At 503, the quantum candidates are aggregated into groups as a function of one or more of time, location, transition and constraints. The aggregation may include an aggregation of each individual's decisions into groups.

For example, sheafing may be used for the aggregation into groups. Sheafing may be used for systematically tracking each individual's data attached (or glued) to open sets of a topological space. A group of individual cognitive sets, which may be represented by $\{_i\}_{i \in I}$, is disjoint if $X_i \cap X_j = \phi$ whenever $i \neq j$. The union of a disjoint family may be expressed as $\sqcup_{i \in I} X_i$. Given a disjoint family of cognitive states, $\{_i\}_{i \in I}$ there is an isomorphism, where each arrow (aggregated for multiple groups) has a specified domain and co-domain group in partially ordered cognitive sets P which may be expressed as follows $$p\left(\sqcup_{i \in I} X_i\right) \xrightarrow{\cong} \prod_{i \in I} p(X_i) :: S \mapsto (S \cap X_i)_{i \in I}$$

The groups determined by sheafing may be used to predict activities for the groups. Based on the predictions for the group, an optimal set of choices may be determined for an individual. For example, if an individual is part of a group determined to be taking the bus from a particular location, an optimal set of choices for an individual in the group may be based on the number of individuals in the group, the bus capacity, etc. Also, content may be delivered to the individual and the content may indicate bus capacity and choices for other travel techniques, such as taxi, train, etc.

Figure 6:
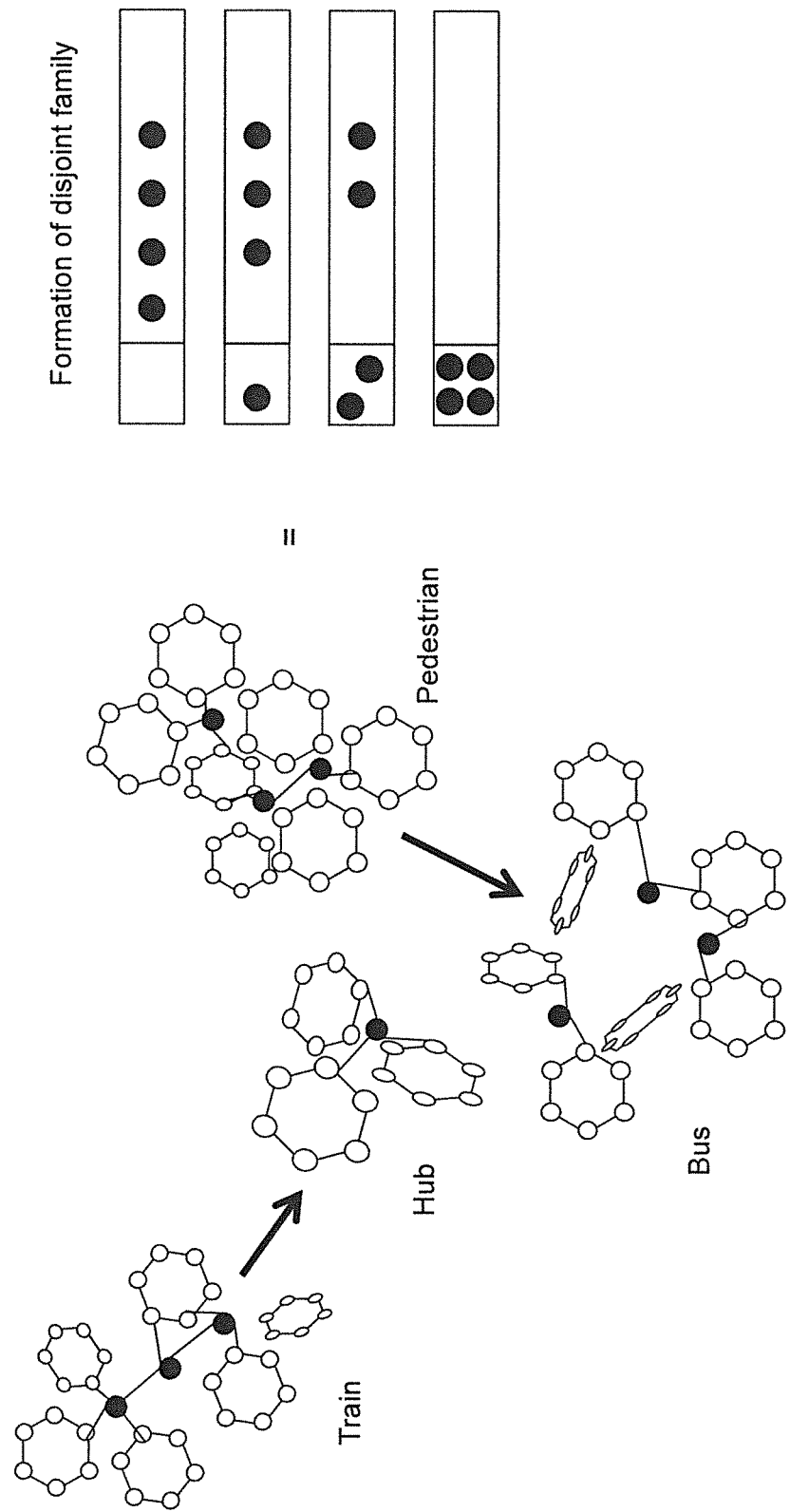
FIG. 6 shows formation of groups based on aggregated cognitive states.

FIG. 6 shows an example of the formation of groups in relation to other individuals and their transitions in cognitive state using the process described with respect to FIG. 5. FIG. 6 shows a group density in the open set for location-based activities related to the locations shown in FIG. 8.

Figure 7:
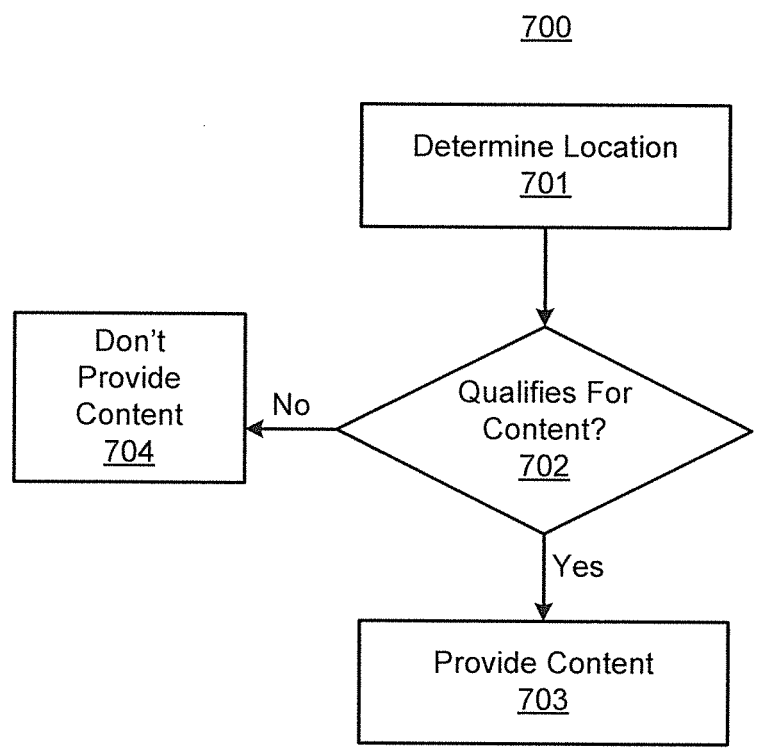
FIG. 7 shows a method for providing content.

FIG. 7 illustrates a method 700 that may be performed by the system 100 to provide content based on location and behavioral information. At step 701, location of an access device, such as one of the access devices 102, is determined. The access device may detect its current geographic location and send it to the system 100. For example, an access device may transmit a location status communication including location status information to the system 100 using the integration module 132. The access device may provide location status information proactively or in response to a request from the system 100.

At step 702, the system 100 determines whether the individual of the access device qualifies to receive content for a target location. This determination may be based on the individual's current location, the individual's proximity to a target location, the cognitive state of the individual and other behavioral information for the individual.

At step 703, the system 100 provides the content to the access device of the individual if the individual qualifies. The content may be content determined to be associated with the target location, such as content published by a different individual or other entity that is associated with the target location. If the individual is not qualified, then the content is not provided to the individual at step 704. The method 700 is repeated as the location of the individual changes.

Referring back to step 702, the system 100 determines whether the individual of the access device qualifies to receive content for a target location. This determination may be based on whether the target location of an access device is "proximate" to a geographic location associated with a content instance. A content instance represents content that has certain attributes associated therewith, such as a geographical location, access rights, a cognitive state, etc. One or more questions may be triggered to determine if the individual qualifies based on the attributes associated with the content instance. "Proximate" may refer to the target geographic location of an access device being within a predefined geographic proximity (e.g., within a predetermined distance). The proximity may be defined in any suitable way, including as any location that is located within a specific distance (e.g., radial distance) of the target geographic location and/or dynamic geographic location. Other factors may also be considered.

Distribution of a content instance may include making the content instance accessible to an access device. This may be performed in any suitable way. In certain embodiments, when "proximate" is found, a copy of a corresponding content instance may be automatically provided (e.g., downloaded) to the access device.

In another embodiment, to access a content instance, choice data may be stored and updated for an individual with appropriate permissions settings and/or with links to appropriate decision-making probabilities on content instances. For example, a link to a content instance associated with a target geographic location may be inserted into a profile associated with a user ID of an individual in order to make the content instance accessible to the access device of the individual.

Content services in the system 100 may be configured to provide notifications to one or more access devices indicating that published content has been made accessible. For example, the system 100 may provide a notification to an access device indicating that the content instance associated with target geographic location has been made accessible to the access device. Such notification may be in any suitable form and use any acceptable communication technology. The notification may include information associated with the content instance, including a description provided as a trigger end-state for the individual, geographic location or any other data associated with the content instance. The access device may receive the notification, and the individual may elect whether to retrieve the accessible content instance. In some embodiments, current geographic proximity to the geographic location may be requisite for accessibility to the associated content instance and in other embodiments, once accessibility to content is granted, accessibility is maintained for a predefined length of time, such as a day, week, month, or indefinitely. Accordingly, an individual may have access to content associated with geographic location based on past or present detected proximity of the access device to the geographic location.

Figure 8:
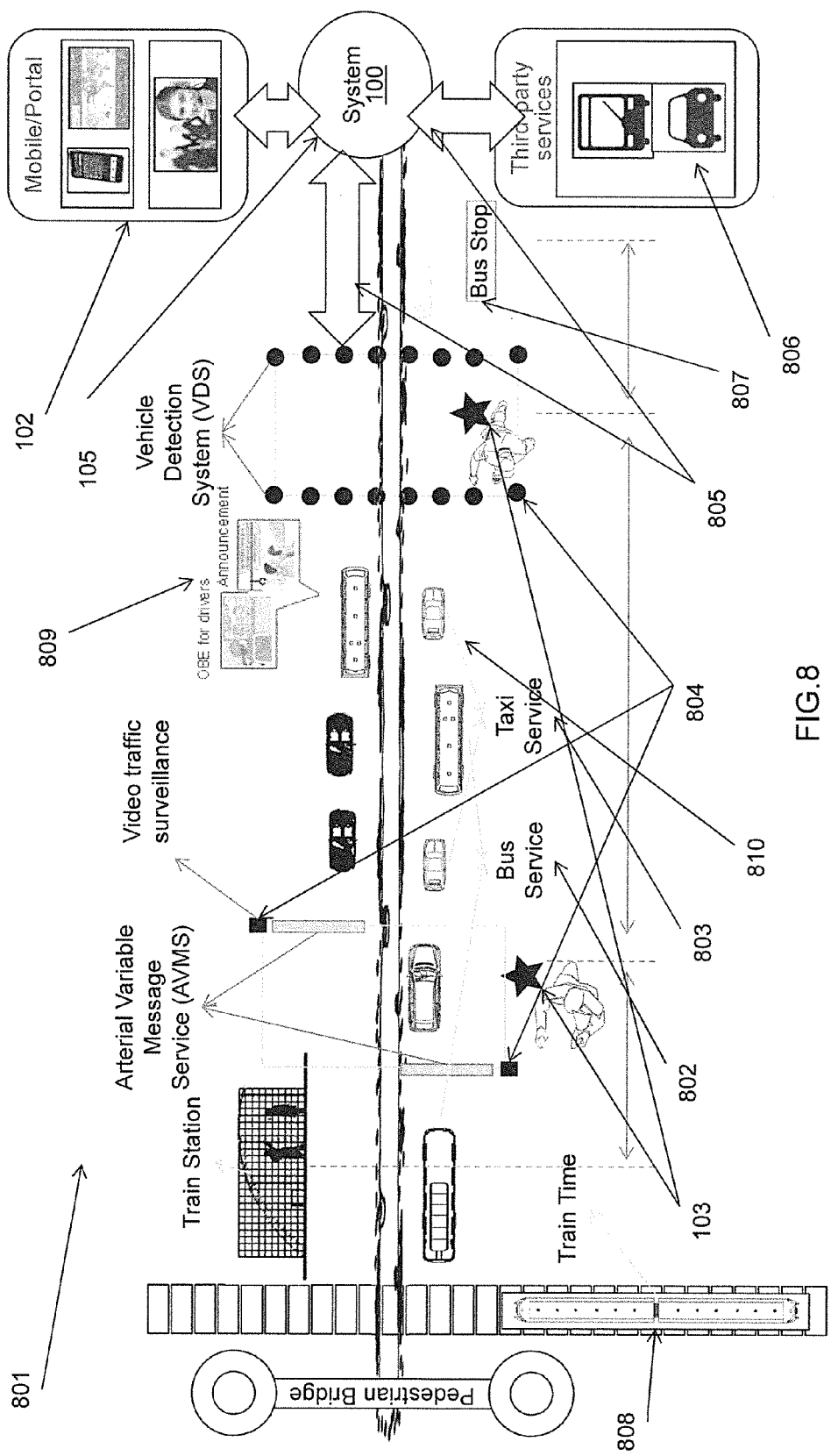
FIG. 8 shows a travel path.

FIG. 8 shows an example of a user on a travel path to work. Various sensors capture location information and other information to determine the current activity (e.g., the user is currently on a travel path to their office), and to determine a choice set for a next activity (e.g., bus, taxi, train, etc.) and provides an example of optimizing services. Different triggers may be generated to confirm predictions or to determine current activity. For example, location-specific triggers may be triggered at locations to confirm selective forecasting and optimization during location-based unicast and multicast 805 of content and display services 809.

FIG. 8 also shows examples of sensors that may be used by service providers to capture behavior information for analyses and predictions to respond dynamically through the integration services within an ultra-short duration. The sensors may include Arterial Variable Message Service (AVMS), video traffic surveillance, vehicle detection system (VDS) and on-board equipment (OBE), etc. An individual may create and post content associated with geographic locations within a geographic footprint. Content may be unicasted or multicasted to one or more access devices and the system 100. The system 100 stores the content from many individuals which is tagged with geo-tags and other tags. Service providers may use this information to make predictions and decisions, such as dispatching additional busses or taxis to a location that is predicted to have a greater than normal demand.

The travel path shown in FIG. 8 includes several target geographic locations 802 and target activities 803 associated with content published within network. Reference numbers 802 through 805 represent several content detected target geographic locations 802 of access device 102 along mobility path 701. In one example, the individual associated with the access device does not qualify for the contents at 802-805. In another example, if the individual is located within proximity of one of the locations, the individual may receive the corresponding content. Accordingly, the system 100 may grant an access device and/or its associated individual with access to the published content instances respectively associated with target geographic locations. In certain embodiments, access may be maintained after the access device has moved outside of the proximities of the activities 803 and locations 802.

Figures 9A, 9B, 9C:

FIGS. 9A-C shows examples of screen shots that may be generated by an application executed by an access device. The screen shots illustrate that an individual's choices and preferences and other information may be entered and that the information can be sent to the system 100 and used for predictions. As an example, an individual may use an access device to provide behavioral information related to commuting route and mode of transport, and that information may be transmitted to the system 100 or other access devices. Screen shot 901 shown in FIG. 9A shows that an individual may enter their current location, shown as origin 902, and their destination, shown as 903. Choices for entering current location and destination may be determined from historical data and may be presented via a drop down menu. Also, the system 100 may determine the current location 902 from a location sensor provided in the access device. The destination may be predicted and confirmed. For example, a trigger may be sent to the access device to request that the individual confirm their current activity or location and confirm their destination location or next activity.

FIG. 9A also shows that transactional data in addition to location may be determined by the access device. For example, time, weather, etc., may be sent along with location and a user ID for the individual to the system 100.

Screen shot 910 shown in FIG. 9B shows that a transportation mode may be entered by an individual and screen shot 911 in FIG. 9C shows that a route may be selected by an individual. This information may be predicted by the system 100 and triggers may be generated to request confirmation of the predictions. For example, the system 100 may predict that the user is taking the train to work and the screen may display a confirmation request and the user can confirm "only train" or indicate a different mode.

Figures 10B, 10C:
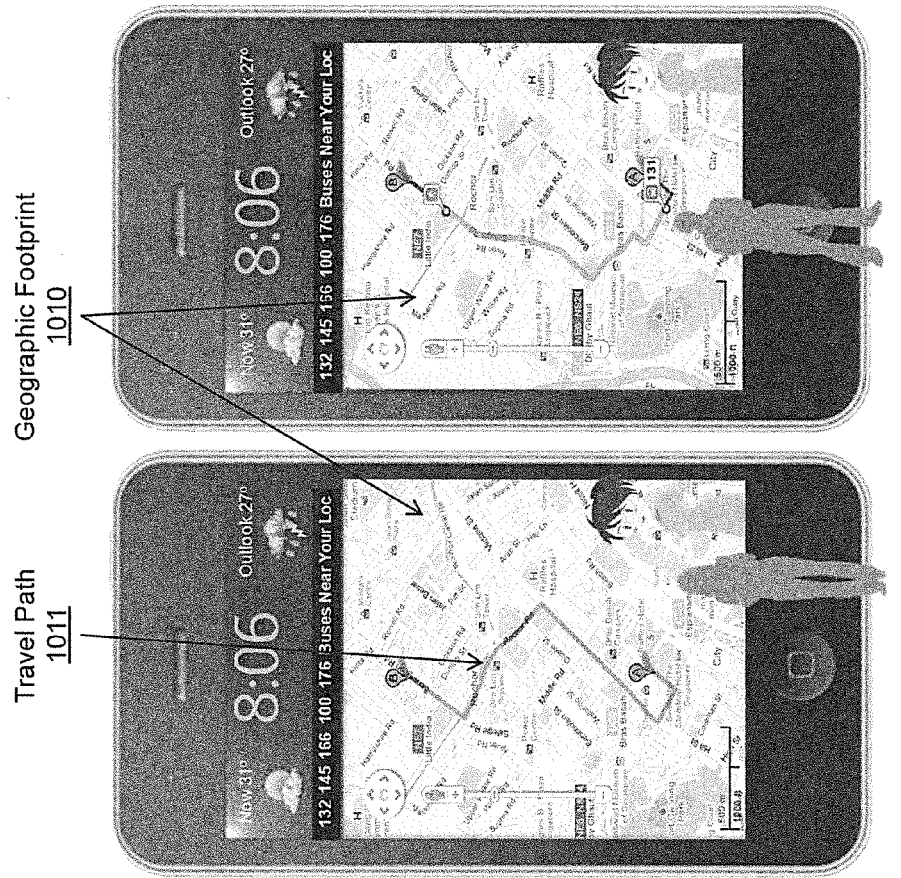
Figure 10A:
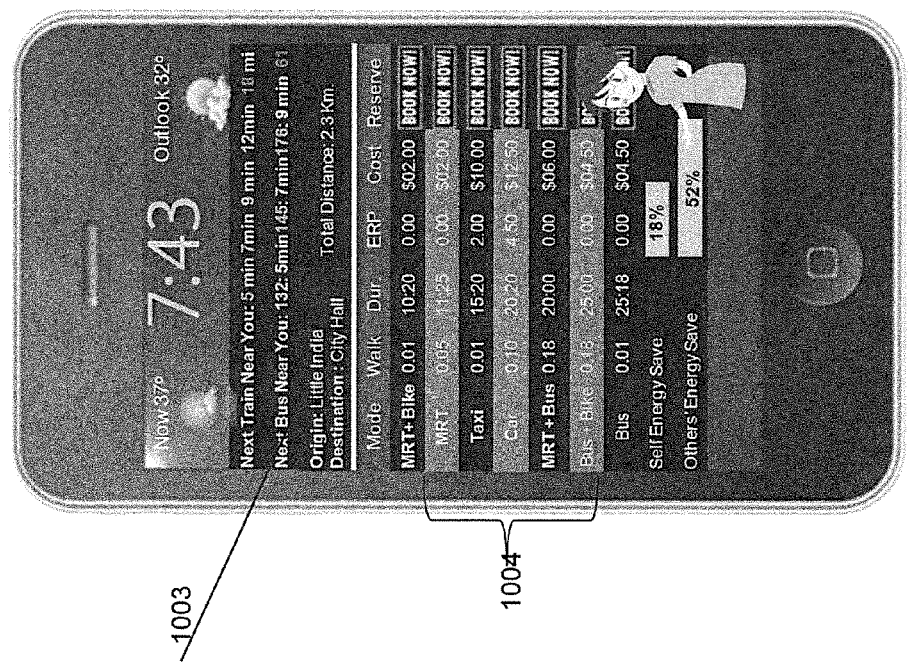

FIGS. 10A-C show additional examples of screenshots. The screenshot in FIG. 10A shows an individual's choice set of transportation mode options 1004 when the individual is at a current location 1002 (e.g., Little India) and the individual is travelling to a destination 1003 (e.g., City Hall). The choice set 1004 may be based on user settings and/or may be predicted from historical data. FIGS. 10B-C show a geographical footprint 1010 which refers to a collective geographic space within which the access devices 102 may roam and connect to the system 100. FIGS. 10B-C show that the geographical footprint 1010 may extend beyond a display and may be scrolled to view different areas within the geographical footprint 1010.

As described above, a location sensor in an access device may detect the geographic location of the access device within the geographical footprint 1010 and the geographic location is sent to the system 100. The location of the access device may be periodically transmitted at a predetermined frequency or time, or in response to a predetermined trigger event to monitor travel path of the access device. Such a trigger event may include a detection of a content creation event or a prompt to push content at the current location, the destination, or in the travel path 1011.

As an example, location-based content services provided by the system 100 may be configured to recognize when content is created and, in response to such a content, instruct the access device location services to determine the geographic location of the access device. For example, location map data may be provided to the system 100 for storage and/or for providing location-based content services to the individual. A historic log of detected geographic locations of the access device may be updated.

The system 100 may associate content with location data and other information. For example, content may be created using an access device, and the geographic location of the access device at the time that the content created is used to create a "geo-tag" that is associated with the content. In this or similar manner, the location-based content services may associate other information with content, including, but not limited to, timestamps (e.g., the time and/or date when the content was created), individual identifiers (e.g., an identifier for an individual associated with the access device and/or who created the content), and content descriptions or type identifiers (e.g., a photograph content-type identifier). This other information, once associated with the content, may be referred to as "other tag" data. Geo-tag data and/or other tag data associated with content may be utilized for selective retrieval and distribution.

The location-based content services provide an individual of an access device with a capability of creating and publishing a content at a specific location within the network footprint 1010. As an example, an individual with an access device may be physically located at a particular geographic location within the travel path 1011. The individual may utilize the access device to create content, such as searching for nearest restaurant. Content (e.g., an image file of a restaurant) is already stored in the data storage of the system 100. Location-based target content services recognize a content creation event and instruct the location-based services to detect the geographic location of the access device. The location services detect the geographic location and provide location data, i.e., geo-tag data, representing the detected geographic location of the access device. Location-based target content services 112 associate the location data with the content and provides the content, associated geo-tag data, and optionally other associated tag data to the system 100.

Figure 11:
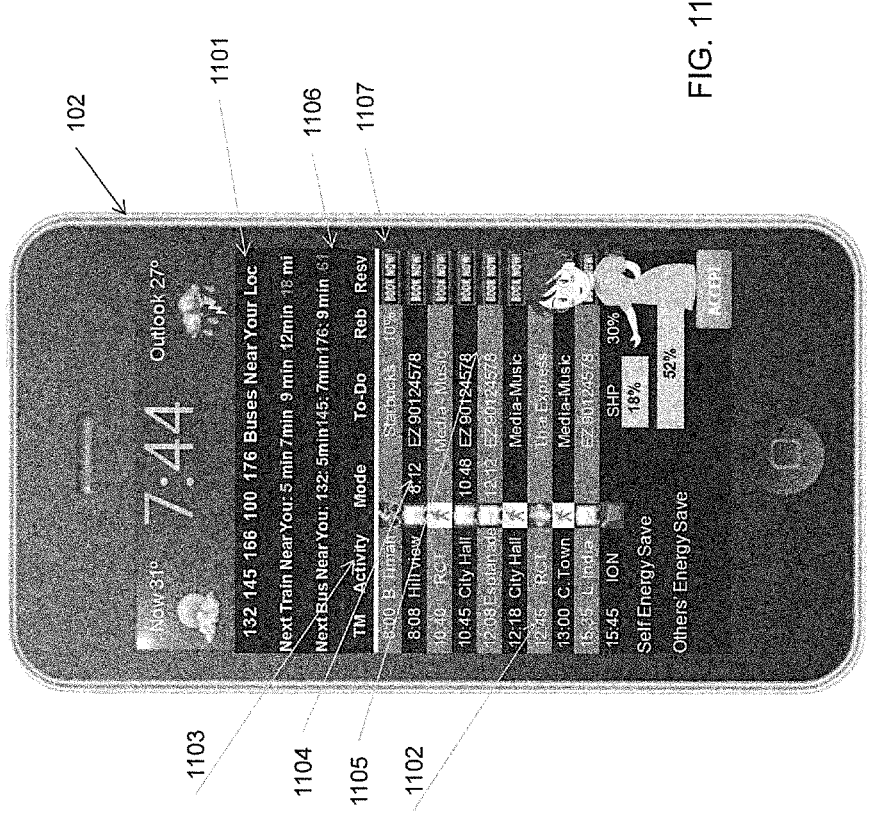

FIG. 11 illustrates an example of a screen shot of location content representation 1101 between data records associated with a travel path. The decision-making content data may include target content and activity data, and geo-tag data may include target geo-tags. Content instances may represent content respectively associated with target geographic locations. For example, location content data 1102-1105 correspond to locations 802-805 shown in FIG. 8. The location content data 1102-1105 may be provided based on proximity to the target locations 802-805 shown in FIG. 8. Content services may be configured to utilize data included in the content representation 1101 to search for and identify matching geo-tag data. The arrows illustrated in FIG. 11 represent identified matches between detected location and a geo-tag.

Content may be provided for the individual to experience the content and individuals may annotate the content in some instances. For example, an access device may receive a notification of a content instance having been made accessible to the access device based on a detected target location. The individual may choose to experience the content. In addition, the individual may make one or more annotations to the content instance for an activity instance, including, but not limited to, providing the content instance for a specific activity instance (e.g., "The menu comparison in food-courts at shopping malls!"), review of the content instance (e.g., on a predetermined scale on movie at shopping malls), editing the content instance, blocking the content from being made accessible to the access device and/or the individual, and reporting the content instance (e.g., as including inappropriate or distasteful material). The access device may provide the annotation to the system 100. The annotation may be added to other tag data associated with the content instance. Accordingly, annotations, may be used to index, search, and retrieve the content instance for activity instance. For example, an individual may search accessible content for specific content instances having a particular rating, associated with a particular creator, created during a particular time range, having associated comments, etc.

The system 100 may be configured to enable individuals to communicate with one another in connection with a target geographic location. The messages between the individuals form a thread. For example, at a location for a content instance, the individual may establish and participate in follow-up communications with one another. Such follow-up communications may be hosted and made accessible to the involved individual, and in some instances, such communications are made accessible exclusively to the involved individuals.

Figures 12A, 12B:
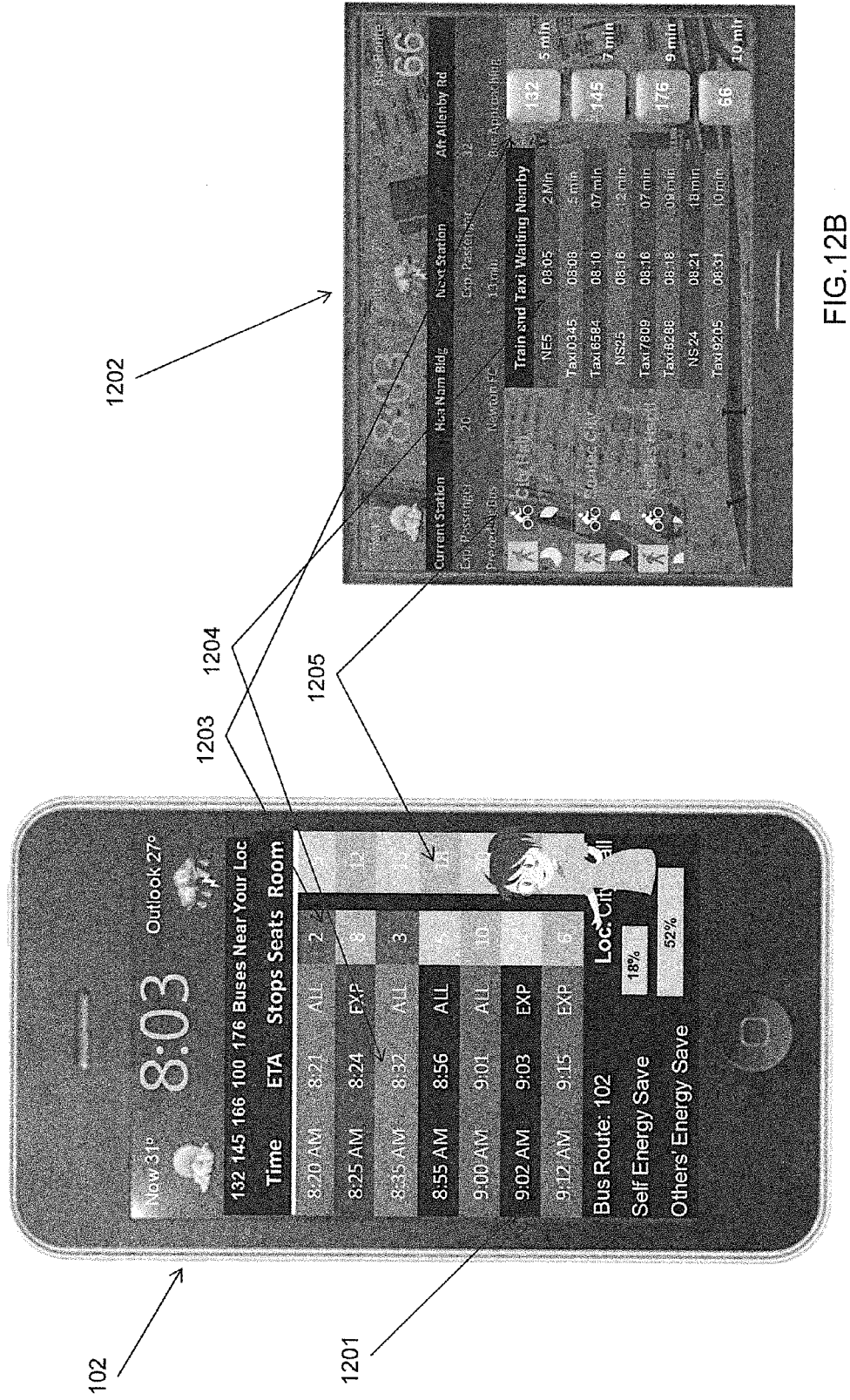

FIGS. 12A-B show screenshots for an access device. An individual may utilize the access device to post content and retrieve and experience content based on target locations. FIGS. 12A-B show that an individual may experience content and annotate the content. In an example, an individual may travel between locations along a travel path and the detected location may qualify the individual for access to content. An individual may elect to utilize additional access devices (e.g., bus kiosk) to retrieve and experience content. Accordingly, after traveling from one location to another, the individual may access additional access content instances, a communication display, a communication thread and sensor communications to retrieve, experience, and annotate content that has been made accessible.

Figure 13:
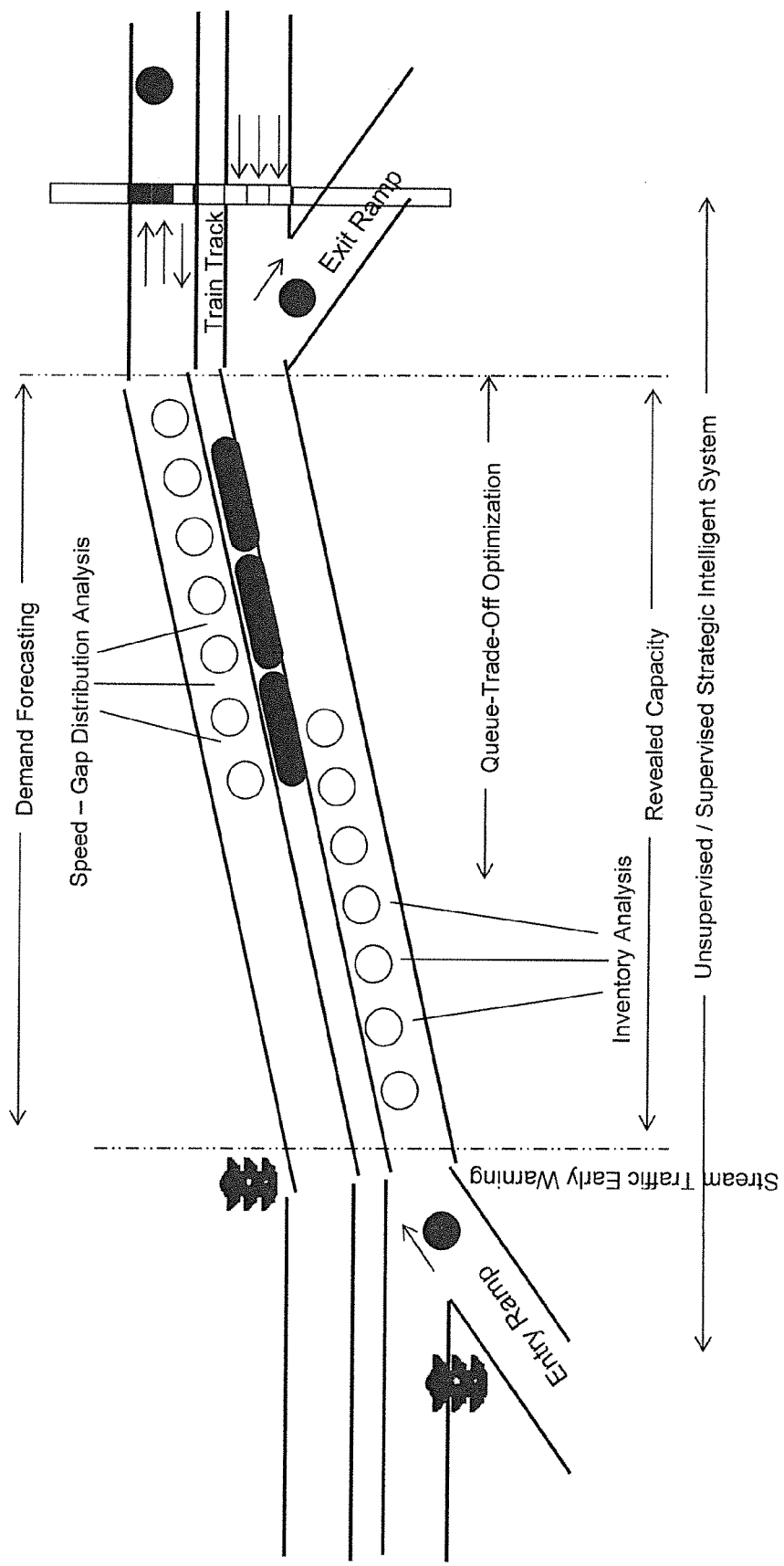
FIG. 13 shows a portion of a travel path to illustrate speed gap analysis and demand forecasting.

FIG. 13 illustrates an example of the system 100 using dynamic context to determine a choice set. Dynamic context takes into consideration an individual's direction and speed to generate timely choice sets. Speed gap distribution analysis may be performed by the system 100 to determine the distance between individuals in a travel path as they move toward a destination. For example, one individual is moving at a particular speed and another individual is moving at another speed on a travel path, and the gap between these two is the speed gap.

In one example, the speed gap may be used by transportation authorities or service providers to determine your location, speed and direction and then fulfill your demand for transportation by the supply, such as a taxi driver that has to pick you up and take you to your destination. Your satisfaction of the transport service may depend on how quickly they can pick you up and take you to your destination. Your satisfaction is an indication of your cognitive state which may be used to aggregate you into a group and determine choice sets. Also, wherever you want to go.

FIG. 13 shows a portion of a travel path and the speed gap between individuals. Inventory represents the number of cabs or number of transportation types available in that particular location for travel from point a to point b. The queue-tradeoff-optimization implies that an individual can take the taxi or the train or another form of transportation. These factors are considered for transportation demand forecasting.

While the embodiments have been described with reference to examples, those skilled in the art will be able to make various modifications to the described embodiments without departing from the scope of the claimed embodiments. Furthermore, the location-based cognitive and predictive communication system is generally described with respect to providing cognitive and predictive information for transportation services by way of example. The system may be used for other services as well, such as for emergency location-based services, shopping services, location-based social-mobile services, health-care (intelligence based treatment), financial (credit card usage) or for timely providing content related to any subject matter based on location, time and other metrics and constraints.

What is claimed is:

1. A location-based cognitive and predictive communication system comprising:
    a network interface connected to sensors to receive transactional data for an individual measured by the sensors;
    a memory to store the transactional data, wherein the transactional data is associated with a current travel path for the individual and includes a time and geographic location for the individual on the travel path; and
    a prediction module to determine, by a processor, a current activity for the individual based on a prediction determined from the transactional data, wherein the prediction determined from the transactional data is a probability that the individual is enroute to a destination, and
    the prediction module is to determine, by the processor, a choice set for the individual based on the current activity and based on predictions for a group for which the individual is a member, wherein the choice set includes choices associated with transportation for the current travel path of the individual, and wherein
    the network interface is to transmit the choice set to an access device via network to present the choice set to the individual.

2. The system of claim 1, comprising a content module to determine content related to the current activity and a target activity related to a choice in the choice set, and the content is transmitted to the access device with the choice set.

3. The system of claim 2, wherein the content module is to determine a speed gap between the individual and a second individual, and transmit the content to the individual if the speed gap is less than a predetermined threshold, wherein the content includes content generated by the second individual.

4. The system of claim 3, comprising an integration module to facilitate a dynamic communication thread between the individual and the second individual.

5. The system of claim 1, comprising a cognitive state determination module to determine a cognitive state of the individual for a choice from the choice set executed by the individual.

6. The system of claim 5, wherein the cognitive state comprises a utility probability and the cognitive state determination module is to determine the cognitive state by determining choice set attributes for choices in the choice set, calculating a utility for each choice based on the choice set attributes and variables associated with the choices, and determining the utility probability based on the utility, a probability of the individual being in a state at a particular time, and a multidimensional optimizing factor.

7. The system of claim 1, wherein the prediction module is to determine the choice set by accumulating cognitive states for individuals, modeling each individual as a quantum particle based on time and location, sheafing the modeled quantum particles to determine groups of the individuals, and determining the choice set based on predictions for the group for which the individual is a member.

8. A method of providing prediction-based travel choice set comprising:
    determining transactional data from sensors, wherein the transactional data is associated with a current travel path for an individual and includes a time and geographic location for the individual on the travel path;
    determining, by a processor, a current activity for the individual based on a prediction determined from the transactional data, wherein the prediction determined from the transactional data is a probability that the individual is enroute to a destination;
    determining, by the processor, a choice set for the individual based on the current activity and based on predictions for a group for which the individual is a member, wherein the choice set includes choices associated with transportation for the current travel path of the individual; and
    transmitting the choice set to an access device via network to present the choice set to the individual.

9. The method of claim 8, comprising:
    determining a cognitive state of the individual for a choice from the choice set executed by the individual.

10. The method of claim 9, wherein the cognitive state comprises a utility probability and determining a cognitive state comprises:
    determining choice set attributes for choices in the choice set;
    calculating a utility for each choice based on the choice set attributes and variables associated with the choices; and
    determining the utility probability based on the utility, a probability of the individual being in a state at a particular time, and a multidimensional optimizing factor.

11. The method of claim 8, wherein determining a choice set comprises:
   accumulating cognitive states for individuals;
   modeling each individual as a quantum particle based on time and location;
   sheafing the modeled quantum particles to determine groups of the individuals; and
   determining the choice set based on predictions for the group for which the individual is a member.

12. The method of claim 8, comprising:
   determining content associated with choices in the choice set based on the transaction data; and
   transmitting the content to the access device via the network.

13. The method of claim 12, wherein determining content comprises:
   determining a speed gap between the individual and a second individual; and
   transmitting the content comprises transmitting the content to the individual associated with a choice in the choice set to the individual if the speed gap is less than a predetermined threshold, wherein the content includes content generated by the second individual.

14. The method of claim 13, comprising:
   facilitating a dynamic communication thread between the individual and the second individual.

15. A non-transitory computer readable medium including machine readable instructions that are executable by a computer processor to:
   determine transactional data from sensors, wherein the transactional data is associated with a current travel path for an individual and includes a time and geographic location for the individual on the travel path;
   determine a current activity for the individual based on a prediction determined from the transactional data, wherein the prediction determined from the transactional data is a probability that the individual is enroute to a destination;
   determine a choice set for the individual based on the current activity and based on predictions for a group for which the individual is a member, wherein the choice set includes choices associated with transportation for the current travel path of the individual; and
   transmit the choice set to an access device via network to present the choice set to the individual.

16. The non-transitory computer readable medium of claim 15, wherein the instructions comprise instructions to:
   determine a cognitive state of the individual for a choice from the choice set executed by the individual.

17. The non-transitory computer readable medium of claim 16, wherein the cognitive state comprises a utility probability and wherein the instructions to determine the cognitive state comprise instructions to:
   determine choice set attributes for choices in the choice set;
   calculate a utility for each choice based on the choice set attributes and variables associated with the choices; and
   determine the utility probability based on the utility, a probability of the individual being in a state at a particular time, and a multidimensional optimizing factor.

18. The non-transitory computer readable medium of claim 15, wherein the instructions to determine the choice set comprise instructions to:
   accumulate cognitive states for individuals;
   model each individual as a quantum particle based on time and location;
   sheaf the modeled quantum particles to determine groups of the individuals; and
   determine the choice set based on predictions for the group for which the individual is a member.

19. The non-transitory computer readable medium of claim 15, wherein the instructions are to:
   determine content associated with choices in the choice set based on the transaction data; and
   transmit the content to the access device via the network.

20. The non-transitory computer readable medium of claim 19, wherein the instructions are to:
   determine a speed gap between the individual and a second individual; and
   transmit the content comprises transmitting the content to the individual associated with a choice in the choice set to the individual if the speed gap is less than a predetermined threshold, wherein the content includes content generated by the second individual.

* * * * *

UNITED STATES PATENT AND TRADEMARK OFFICE
CERTIFICATE OF CORRECTION

PATENT NO. : 9,026,139 B2
APPLICATION NO. : 13/840055
DATED : May 5, 2015
INVENTOR(S) : Prabir Sen Page 1 of 1

It is certified that error appears in the above-identified patent and that said Letters Patent is hereby corrected as shown below:

Title page, item (30) foreign application priority data should read "201203337-9".

Signed and Sealed this
Fifteenth Day of September, 2015

Michelle K. Lee
*Director of the United States Patent and Trademark Office*